United States Patent
Bonazzoli et al.

(10) Patent No.: US 10,044,653 B2
(45) Date of Patent: Aug. 7, 2018

(54) ELECTRONIC MESSAGE CONTENT DOWNLOAD MANAGEMENT

(71) Applicant: International Business Machines Corporation, Armonk, NY (US)

(72) Inventors: Simone Bonazzoli, Castel Gandolfo (IT); Marco Borgianni, Rome (IT); Claudio Falcone, Rome (IT); Alessio Fioravanti, Rome (IT); Giuseppe Longobardi, Castellammare di Stabia (IT); Silvano Lutri, Rome (IT); Luigi Presti, L'Aquila (IT); Paolo Salerno, Monterotondo (IT); Alessandro Tomasi, Aprilia (IT); Francesca Ziantoni, Vicovaro (IT)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 14/959,434

(22) Filed: Dec. 4, 2015

(65) Prior Publication Data

US 2017/0163579 A1  Jun. 8, 2017

(51) Int. Cl.
*H04L 12/58* (2006.01)
*H04L 29/08* (2006.01)

(52) U.S. Cl.
CPC .............. *H04L 51/08* (2013.01); *H04L 67/06* (2013.01)

(58) Field of Classification Search
CPC ....... H04L 51/08; H04L 67/06; H04L 51/063; H04L 51/066; H04L 51/26; G06Q 10/107; G06Q 30/06
USPC ........................................................ 709/206
See application file for complete search history.

(56) References Cited

U.S. PATENT DOCUMENTS

| | | | | |
|---|---|---|---|---|
| 2002/0143894 | A1* | 10/2002 | Takayama | G06Q 30/06 709/217 |
| 2005/0193070 | A1* | 9/2005 | Brown | G06Q 10/107 709/206 |
| 2008/0294729 | A1 | 11/2008 | Ionescu et al. | |
| 2011/0153857 | A1 | 6/2011 | Dumitru et al. | |
| 2012/0096346 | A1 | 4/2012 | Sylthe et al. | |
| 2015/0186440 | A1* | 7/2015 | Ramaswamy | G06F 17/30073 707/673 |

OTHER PUBLICATIONS

"Create a Table of Contents Using Anchors (Text Tutorial)", VerticalResponse, Printed Jul. 7, 2015, pp. 1-2,<help.verticalresponse.com/how-to/tutorial/anchor_tags/>.

* cited by examiner

*Primary Examiner* — Tu Nguyen
(74) *Attorney, Agent, or Firm* — Stephen R. Yoder (57) ABSTRACT

A messaging system creates a content index for messages for user selection of all of part of a message. By selecting only an indexed portion of the message, the user avoids downloading unneeded portions of the message. The content index is created according to pre-defined user criteria and semantic analysis of the contents of the message.

19 Claims, 4 Drawing Sheets

ELECTRONIC MESSAGE CONTENT DOWNLOAD MANAGEMENT

BACKGROUND

The present invention relates generally to the field of electronic messaging, and more particularly to message content transfer size management.

E-mail communication has become an integral part of our life whether at work or during free-time. State of the art e-mail systems allow a user to transfer large amounts of data with the e-mail either as text or as attachments. Oftentimes, problems arise due to constraints on bandwidth and/or memory when using portable devices (such as smartphones).

It is known to allow for downloading only a pre-defined first byte count of an e-mail and to reject a download of the attachment(s) to the e-mail. However, even when this eases the problem, it is not a complete, user-friendly solution.

SUMMARY

Aspects of the present invention provide a method, a computer program product, and a system that include: determining a set of index data for a tagged component of an electronic message; generating a content index based, at least in part, on the set of index data; receiving a selected component indication based, at least in part, on the content index; and incrementing a current download count in a download record corresponding to the tagged component to establish a new download count. The set of index data includes a tagged component name and the current download count.

DETAILED DESCRIPTION

A messaging system creates a content index for messages for user selection of all of part of a message. By selecting only an indexed portion of the message, the user avoids downloading unneeded portions of the message. The content index is created according to pre-defined user criteria and semantic analysis of the contents of the message. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
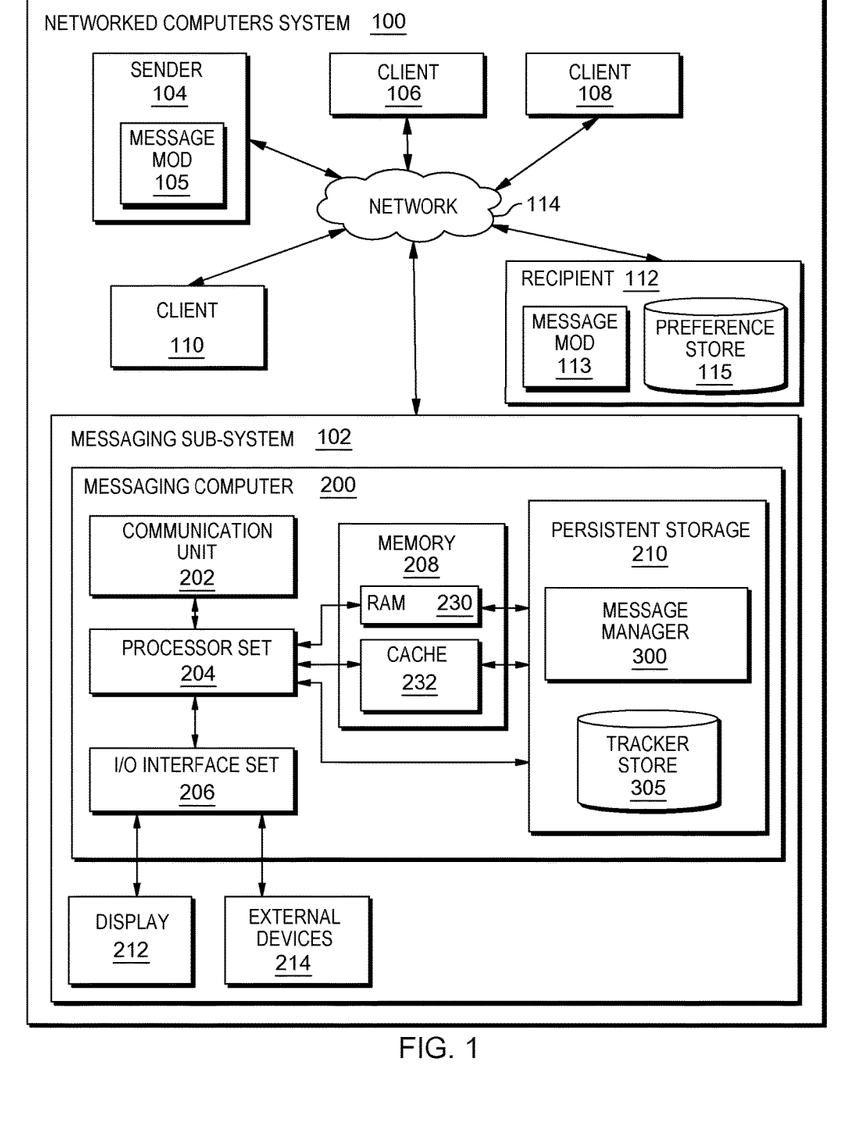
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: messaging sub-system 102; sender sub-system 104; recipient sub-system 112; preference store 115; message modules 105, 113; client sub-systems 106, 108, 110; communication network 114; messaging computer 200; communication unit 202; processor set 204; input/output (I/O) interface set 206; memory device 208; persistent storage device 210; display device 212; external device set 214; random access memory (RAM) devices 230; cache memory device 232; message manager 300; and tracker store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
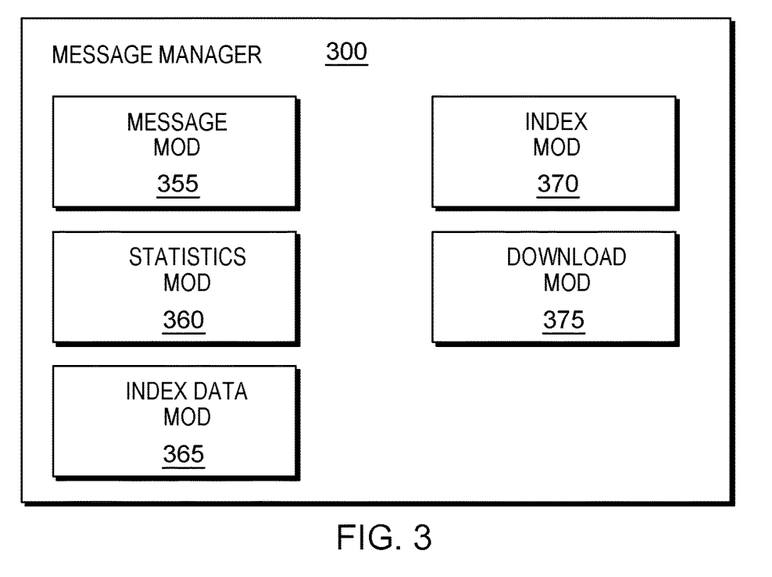
FIG. 3 is a schematic view of a machine logic (for example, software) portion of the first embodiment system.

Message manager 300 operates to enhance legacy electronic messaging systems by creating an index of message content (based, for example, on message size) and for handling the message content on a component-specific basis for the message according to the index. Additionally, some embodiments of the present invention index message content according to sender preference. Alternatively, the index is created according to a default system setting.

Some embodiments of the present invention recognize the following facts, potential problems and/or potential areas for improvement with respect to the current state of the art: (i) conventional messaging systems provide a standardized way to tag the message content, based on XML formatting; and/or (ii) message recipients often are only interested in certain portion the message, whether the subject line or a document "attached" to the message.

Some embodiments of the present invention analyze an electronic message and create a content index where a summary is created using a semantic engine that classifies component parts according to a topic of the message. Also, the component parts are, in some examples, created according to pre-defined rules and/or user-defined tags. Attachments are tagged according to the content of the attachment, as determined by semantic analysis.

Figure 2:
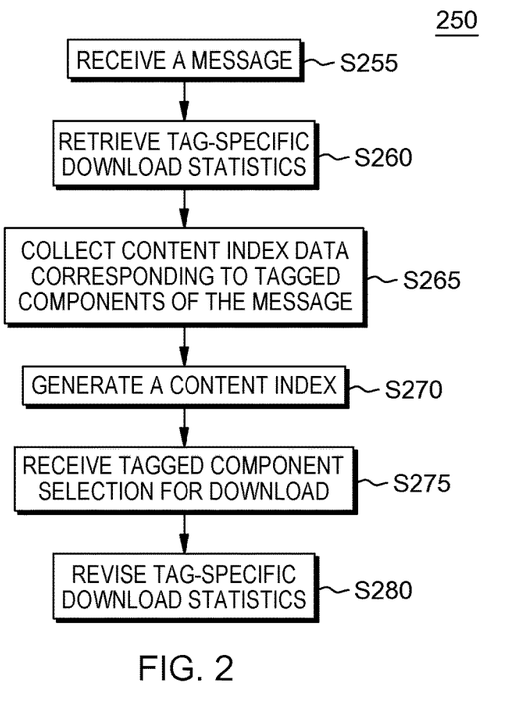
FIG. 2 is a flowchart showing a first method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where message module ("mod") 355 receives a message. Generally, the message is an electronic message transmitted over a network to one or more recipients. The message is addressed to a specified set of recipients, such as recipient 112 (FIG. 1). In this example, sender 104 sends a message via message mod 105 over network 114 through messaging sub-system 102 for processing by message manager 300 and then to a set of recipients including recipient 112, via message mod 113. (See FIG. 1.)

Processing proceeds to step S260, where statistics mod 360 retrieves tag-specific download statistics. The message received in step S255 includes tagged components (also portions, or sections) of the message. Alternatively, the message is processed by the message module to include automatically generated tagged components. For a given tagged component, download data is recorded in tracker store 302. Alternatively, the tacking information is stored in the message itself as meta-data. Download data includes a count for each download request for a certain tagged component, such as an attachment, or a body portion of the message.

According to some embodiments of the present invention, a message is classified or assigned a type for tracking purposes. As particular tagged components of similarly typed messages are downloaded, a download count is recorded. For example, if a meeting agenda e-mail is frequently circulated within XYZ Corporation, an "agenda-type" message is tracked where a common tagged component is the agenda attachment. While download statistics may be based on similar messages, in this example, the download statistics are based on download activity by recipients of the specific message in question.

Download statistics are tracked for frequency that the agenda document is requested for download. The statistics may indicates that no other portion of the agenda-type message is downloaded by recipients. Information such as this support automated download actions, discussed in more detail later in this detailed description.

Processing proceeds to step S265, where index data mod 365 collects content index data corresponding to tagged components of the message. Content index data may include: (i) the tag(s) for a given component of the message; (ii) download statistics for the given component according to downloaded tag(s) in the message or, in some embodiments, in similar messages; and/or (iii) sender-specific content data, such as remarks on component importance or relevance to a particular designated recipient. Some embodiments of the present invention are directed to additional data input by the sender to indicate strong download, or no download, preference. Where a sender indicates an importance for a tagged component to be downloaded, the content index conveys that information to the recipient. Alternatively, a particular importance indicator triggers automatic download of the corresponding tagged component.

Processing proceeds to step S270, where index mod 370 generates a content index. The content index is generated according to recipient-specific preferences identified in preference store 115 (FIG. 1). In this example, the content index is displayed to recipient 112 (FIG. 1) in order of download count with highest download count first. The content index is displayed to the recipient prior to display of the message. In some embodiments, as described below, an e-mail message header includes a selectable content index. Alternatively, the content index is generated according to a pre-defined policy associated with a group of associated recipients.

Processing proceeds to step S275, where download mod 375 receives a tagged-component selection for download. In this example, the displayed content index provides for the recipient to select only certain tagged components of the message for download. Upon selection of tagged components listed in the content index, downloaded tagged components are displayed to the recipient. Alternatively, downloaded content is stored in a download store (not shown) for later reference. Where the message is an e-mail without attachments, the selected tagged components, such as message body, subject line, etc. are displayed together, omitting the non-selected components, which may be generally less interesting to the recipient, such as addressee block and/or signature block.

Processing ends at step S280, where statistics mod 360 revises the tag-specific download statistics. In this example, the message-specific download data is update to indicate those tagged components that recipient 112 downloaded. Alternatively, or additionally, tagged component download data is stored with respect to the type of message received.

Further embodiments of the present invention are discussed in the paragraphs that follow and later with reference to FIGS. 4-5.

Some embodiments of the present invention are directed to notifying a recipient of an e-mail with an index of the e-mail content when an e-mail is received by the e-mail server. In that way, the recipient decides to retrieve from the e-mail server all the e-mail parts (the whole indexed content) or only a set of component parts of the e-mail according to the interest of the recipient. The term recipient, as used herein, refers to any user identified in an electronic message as an intended reader, whether addressed to the user or otherwise marked as intended for receipt by the user. It should be noted that recording an unintended recipient as intended for receipt results in the unintended recipient being a "recipient" for purposes of this discussion. In some embodiments, the recipient selects component parts from the index provided to the recipient. Alternatively, the recipient pre-selects specific component parts of e-mails to be stored in a component parts store (not shown). This pre-selection may be according to a specific sender, or otherwise filtered prior to storing the pre-selected component parts.

Some embodiments of the present invention are directed to making automatic component part retrieval decisions according to a network and/or target characteristic determination. Alternatively, the automated retrieval decision is based on the e-mail size as a whole with regard to a specified threshold.

Some embodiments of the present invention provide for a sender to insert tags that delimit the e-mail component parts that are included in the index of e-mail content. Further, attachments that are included may be automatically tagged for indexing. If each document in a given e-mail is properly tagged, the e-mail may be split into several documents according to a pre-defined retrieval operation. Alternatively, tags are applied to attachments automatically according to e-mail size with respect to a threshold size.

Some embodiments of the present invention are directed to counting the characters and/or lines of the e-mail text and understanding the relevance of text to the comprehension of the e-mail message (for example, the 10th e-mail down the forward chain may not be relevant anymore as content, so it can be merely cited as a link in the e-mail index. By using semantic and/or text comprehension algorithms the e-mail system automatically creates a summary of the e-mail content.

An example database for controlling the indexing of e-mail content contains, for example: (i) syntax rules (these rules are used to split the message based on its contents); and (ii) size rules (these rules are used to associate a weight to each part of the message).

Regarding syntax rules, an index creator module accesses the e-mail content and creates an index based on: (i) paragraphs; (ii) mail threads (such as replies, forwards); (iii) attachments; and (iv) images. Further, regarding size rules, there are three weight categories: (i) low; (ii) medium; and (iii) high. The designated weight supports identifying a network bandwidth for downloading the e-mail message.

According to some embodiments of the present invention, e-mail messages include: (i) user-defined system tags; (ii) automatically-associated system tags; and/or (iii) other information, such as number of clicks, and ranking.

With regarding to ranking, when an entitled user clicks on an email index entry, the corresponding section of the email is downloaded and the server updates the statistics of that index entry, or index section, creating a download-ranking. According to some embodiments of the present invention, a user manually ranks a downloaded email part, or section, after reading/viewing the downloaded part. For example, a user may provide a rating from 1 to 5 with a default rank of 3.

Some embodiments of the present invention use the value of the ranking (average or weight) and/or the number of downloads of an email section, which may be reflected in the number of selections or mouse clicks of a given index entry, to arrange the index content. For example, collapsing "unused" or "low-ranked" index sections. Also, for example, expanding index sections highly used or "high-ranked," to provide more granularity for a case where a given index section may be split into multiple sections based on the section size.

Some embodiments of the present invention are directed to generating a content index for e-mail messages to allow the recipient to select a component part of interest, thus reducing the amount of data downloaded by the recipient. In some embodiments, the content index is provide to the recipient in the header of the e-mail message.

Figure 4:
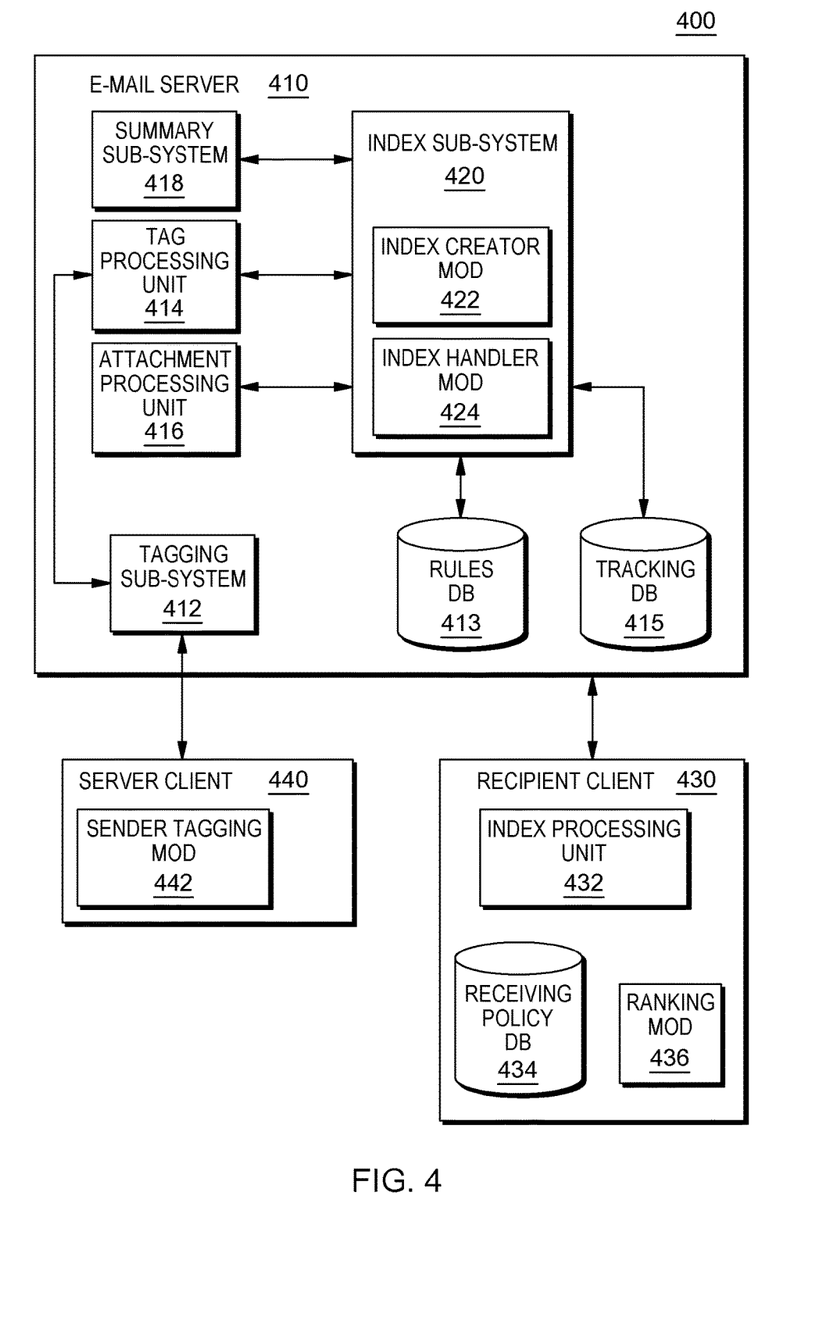
FIG. 4 is a block diagram view of a second embodiment of a system according to the present invention.
Figure 5:
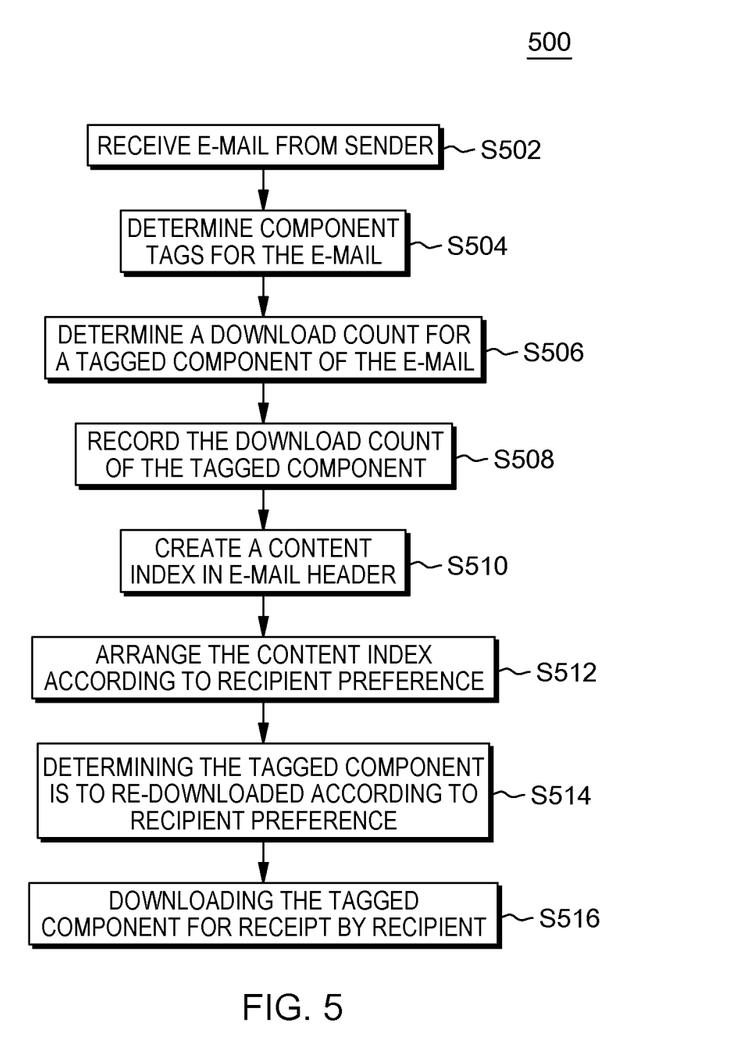
FIG. 5 is a flowchart showing a second method performed, at least in part, by the second embodiment system.

FIG. 4 shows a block diagram depicting e-mail management system 400 according to an embodiment of the present invention, including: e-mail server 410; tagging sub-system 412; rules database 413; tag processing unit 414; tracking database 415; attachment processing unit 416; summary sub-system 418; index sub-system 420; index creator module 422; index handler module 424; recipient client sub-system 430; index processing unit 432; receiving policy database 434; index ranking module 436; sender client sub-system 440; and sender tagging unit 442. FIG. 5 shows method 500 performed at least in part by e-mail management system 400. This method and the associated system will now be discussed, over the course of the following paragraphs, with extensive reference to FIG. 4 (for the system blocks) and FIG. 5 (for the method steps).

Processing begins at step S502, where e-mail server 410 receives an e-mail message, or simply an "e-mail," from sender client 440.

Processing proceeds to step S504, where tagging sub-system 412 determines component tags for the e-mail. Component parts of the e-mail may be tagged either by the sender or automatically by the tagging sub-system. The various tags are referred to as component tags and correspond to a particular component part of the email. Component parts of the email may also be assigned by the user or assigned automatically by the tagging sub-system. In this example, a sender determines how the e-mail is divided into component parts and assigns one or more tags respectively corresponding to a particular component part of the e-mail. Alternatively, component determination is driven by pre-defined criteria and default sections, or component parts, such as those component parts shown in Table 1, further below.

Processing proceeds to step S506, where tag processing unit 414 determines a download count for a tagged component of the e-mail. As discussed in more detail later, in this example, the tagged components of an email are tracked for download statistics. When the e-mail is received by e-mail server 410, and upon determining appropriate component tags, a download statistic for the tagged component is retrieved from tracking database 415. Alternatively, for a given e-mail, the tag processing unit retrieves current download data for the specified component(s) of the e-mail. In that way, no long term tracking is maintained over a specified time period, or otherwise stored for later retrieval.

Processing proceeds to step S508, where tag processing unit 414 records the download count determined in step S506. In this example, the download count determined in step S506 replaces any existing download count in the tracking database. Alternatively, tracking data is stored as-appropriate for access over a network (not shown) by various recipient clients, such as recipient client 430. Alternatively, the download count is recorded for the e-mail components as meta-data associate with a download link of a component in a content index, discussed later in this method.

While method 500 does not invoke attachment processing unit 416, the attachment unit performs operations related to attachments of a received e-mail. Attachments are one of several components of an e-mail and are tagged accordingly. When an attachment is either tagged by the sender or tagged automatically by the tagging sub-system, the attachment processing unit performs, for example, download count operations including retrieving download count data from the tracking database and/or updating the download count data.

Similarly, summary sub-system 418 manages processing operations for tagged summaries. Persons skilled in the art will recognize that isolating any of the various possible components of an e-mail may be accomplished in a similar way as is illustrated for attachments and summary sections.

Processing proceeds to step S510, where index creator module 422 of index sub-system 420 creates a content index in the header of the e-mail. The header provides ready access to the recipient for convenient selection of desired components. In this step, the content index data is collected for presentation as an e-mail header.

Processing proceeds to step S512, where index handler 424 arranges the components included in the email in a custom content index according to specified criteria. In this example, the user establishes pre-defined rules in receiving policy database 434 for the user-specific organization of the content index data. Pre-defined rules direct the organization of data such as showing the most downloaded component first or presenting the components according to e-mail structure, that is, if the subject line is an email component and it is first according to reading order, then the first component is the subject line. Many alternative arrangements may be directed by pre-defined rules, whether input by a user, or governed by policy affecting various users.

Further, as described in some detail above, a recipient may rank various portions of e-mail messages. In this example, the recipient inputs ranking data via ranking mod 436 in the recipient client sub-system.

Processing proceeds to step S514, where index handler module 424 determines the tagged component is to be downloaded according to specified criteria. In this example, the specified criteria is the recipient preference, which is stored in rules database 413. Download rules may simply require that a same component, or set of components, be downloaded each time an e-mail is received for a specified recipient by the e-mail server. Alternatively, a download rule requires only tagged components having a threshold download count be automatically downloaded prior to providing the recipient with an option to manually select a tagged component for downloading.

Processing ends at step S516, where index processing unit 432 downloads the tagged component as determined for download in step S514.

An example message content index is shown in Table 1.

TABLE 1

| Message Content Index |
| --- |
| Subject |
| Abstract |
| Summary |
| Body Part |
|     parts_1: tag1 |
|     parts_2: tag2 |
|     . |
|     . |
|     parts_n: tagn |
| Attachment 1 |
|     attach1: tag1 |
|     attach1: tag2 |
|     . |
|     . |
|     attach1: tagn |
| Attachment 2 |
|     attach2: tag1 |
|     attach2: tag2 |
|     . |
|     attach2: tagn |

Some embodiments of the present invention may include one, or more, of the following features, characteristics and/or advantages: (i) provides for re-arranging the content index and listed components parts dynamically and/or differently according to the timing of events; (ii) provides for re-arranging the content index and listed components parts dynamically and/or differently according to the user (reader); (iii) content tagging is performed by the e-mail system at the e-mail server side; (iv) content tagging is performed at the user side, or sender-client side; (v) e-mail content can be user defined and/or selected; (vi) automatic tagging based on the context; (vii) automatic tagging is based on semantic analysis; (viii) provides for dynamic ranking (ex. based on the people accessing the sections); (ix) provides a weight classification of the e-mail message and/or component parts (such as e-mail chain history) based on context; (x) provides a weight classification of the e-mail message and/or component parts (such as e-mail chain history) based on semantic analysis; (xi) provides for dynamic collaboration between the client (user/recipient) and e-mail server (email system) side; and/or (xii) differentiates the users and shows different content or rearranged listing of content for the same e-mail message (for example, a user is not entitled to read certain parts of an e-mail message and the e-mail system makes the item not-selectable in the provided content index) (for another example, a component part becomes more relevant because it is read by many recipients, thus changing the arrangement of component parts organized according to relevance).

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
identifying an electronic message addressed to a first user and a second user, the electronic message including a first tagged component;
determining a set of index data for the first tagged component including an importance indicator associated with the first user and a current download count;
generating a user-specific content index for the first user based, at least in part, on the set of index data including the importance indicator;
receiving a selection of the first tagged component from the first user based on interaction of the first user with the user-specific content index; and
incrementing the current download count in a download record corresponding to the first tagged component to establish a new download count.

2. The method of claim 1, further comprising:
arranging the user-specific content index according to a recipient preference.

3. The method of claim 1, further comprising:
arranging the user-specific content index according to the current download count.

4. The method of claim 1, wherein the importance indicator is a download preference input by the sender.

5. The method of claim 1, further comprising:
displaying the user-specific content index to the first user for selection of message components including the first tagged component
wherein:
the selection of the first tagged component is received from the first user via a mouse click on the first tagged component displayed in the user-specific content index.

6. The method of claim 1, further comprising:
identifying the electronic message as a pre-defined type message having a corresponding tagged component;
wherein:
the download record for the corresponding tagged component of the electronic message includes a total download count including downloads of the corresponding tagged component in a plurality of the pre-defined type messages.

7. A computer program product comprising a non-transitory computer readable storage medium having a set of instructions stored therein which, when executed by a processor, causes the processor to present content information to a message recipient by:
identifying an electronic message addressed to a first user and a second user, the electronic message including a first tagged component;
determining a set of index data for the first tagged component including an importance indicator associated with the first user and a current download count;
generating a user-specific content index for the first user based, at least in part, on the set of index data including the importance indicator;
receiving a selection of the first tagged component from the first user based on interaction of the first user with the user-specific content index; and
incrementing the current download count in a download record corresponding to the first tagged component to establish a new download count.

8. The computer program product of claim 7, further comprising:
arranging the user-specific content index according to a recipient preference.

9. The computer program product of claim 7, further comprising:
arranging the user-specific content index according to the current download count.

10. The computer program product of claim 7, wherein the importance indicator is a download preference input by the sender.

11. The computer program product of claim 7, further comprising:
displaying the user-specific content index to the first user for selection of message components including the first tagged component
wherein:
the selection of the first tagged component is received from the first user via a mouse click on the first tagged component displayed in the user-specific content index.

12. The computer program product of claim 7, further comprising:
identifying the electronic message as a pre-defined type message having a corresponding tagged component;
wherein:
the download record for the corresponding tagged component of the electronic message includes a total download count including downloads of the corresponding tagged component in a plurality of the pre-defined type messages.

13. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to present content information to a message recipient by:
  identifying an electronic message addressed to a first user and a second user, the electronic message including a first tagged component;
  determining a set of index data for the first tagged component including an importance indicator associated with the first user and a current download count;
  generating a user-specific content index for the first user based, at least in part, on the set of index data including the importance indicator;
  receiving a selection of the first tagged component from the first user based on interaction of the first user with the user-specific content index; and
  incrementing the current download count in a download record corresponding to the first tagged component to establish a new download count.

14. The computer system of claim 13, further comprising:
arranging the user-specific content index according to a recipient preference.

15. The computer system of claim 13, further comprising:
arranging the user-specific content index according to the current download count.

16. The computer system of claim 13, wherein the importance indicator is a download preference input by the sender.

17. The computer system of claim 13, wherein the electronic message is an e-mail message.

18. The computer system of claim 13, further comprising:
displaying the user-specific content index to the first user for selection of message components including the first tagged component
wherein:
the selection of the first tagged component is received from the first user via a mouse click on the first tagged component displayed in the user-specific content index.

19. The computer system of claim 13, further comprising:
identifying the electronic message as a pre-defined type message having a corresponding tagged component;
wherein:
the download record for the corresponding tagged component of the electronic message includes a total download count including downloads of the corresponding tagged component in a plurality of the pre-defined type messages.

* * * * *